May 9, 1961 S. W. SATTAVARA 2,983,283
POWER STEERING MECHANISM
Filed July 15, 1959 2 Sheets-Sheet 2

SVEN W. SATTAVARA
INVENTOR.

BY John R. Faulkner
Thomas H. Oster

ATTORNEYS

United States Patent Office 2,983,283
Patented May 9, 1961

2,983,283
POWER STEERING MECHANISM

Sven W. Sattavara, Detroit, Mich., assignor to Ford Motor Company, Dearborn, Mich., a corporation of Delaware Filed July 15, 1959, Ser. No. 827,231

4 Claims. (Cl. 137—622)

This invention relates generally to power steering mechanisms for motor vehicles, and more particularly to an improved servo valve for use in such a system.

Servo valves for use in power steering systems normally include a pair of relatively moveable valve elements shiftable to control application of power, and resilient means for centering the valve elements when no steering effort is being applied. Two general types of servo valves are found in wide use. One is the sliding spool type valve in which the relative movement is linear along the axis of the spool, and the other is the rotary spool type valve in which the relative motion is angular about the axis of the input or output shaft.

The rotary type control valve is often favored because of the simple actuating mechanism required, since ordinarily the input to the steering mechanism is of a rotary nature. However, rotary servo valves have been found to have several disadvantages, notable among which are tendencies toward hydraulic spool bind and high leakage rates. On the other hand, the sliding spool control valve is one in which leakage is easily controlled and which has a minimum tendency toward hydraulic bind. The greatest difficulty in the use of the sliding spool type valve is that the rotary input signal must be converted to linear movement of the valve spool, and the usual motion converting mechanisms are both costly and susceptible to malfunction when in service.

It is an object of this invention to provide an improved, rugged, and precise servo valve for a motor vehicle power steering gear.

Another object is to provide such a servo valve which incorporates the advantages of a sliding spool valve and the simple actuation of a rotary valve.

An additional object of this invention is to provide such a servo valve which employs simple, low-cost parts.

Further objects and advantages of the present invention will be apparent from the following description, reference being had to the accompanying drawing wherein a preferred form of the present invention is clearly shown.

Figure 1:
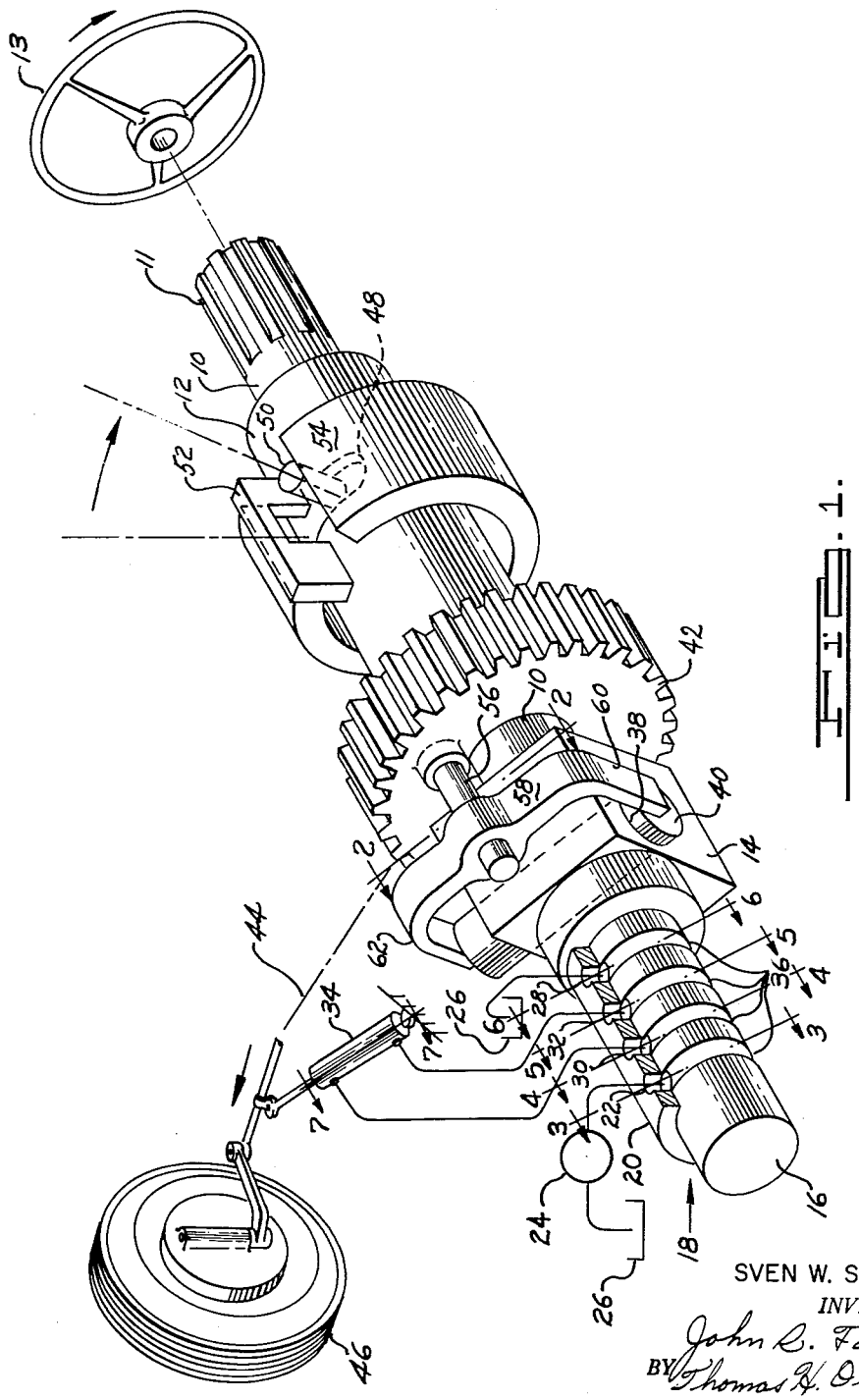
Figure 1 is a perspective view, partly in section, of a servo valve employing the present invention.

The preferred form of the invention illustrated includes an input shaft 10, which has a spline 11 for connection to the steering wheel 13 of a motor vehicle. An output shaft 12 is journalled on shaft 10 for rotation relative thereto. The input shaft 10 extends through the output shaft 12 and has mounted thereon, at the end opposite from spline 11, a valve body 14. Fixedly mounted on the valve body 14 and concentric with the axis of shaft 10 is the internal member 16 of a rotary hydraulic slip coupling generally designated 18, which includes a stationary member 20 having a plurality of hydraulic connection ports therein.

Port 22 of coupling 18 is connected to the outlet of a pump 24 and receives pressure fluid pumped by pump 24 from a reservoir 26. Port 28 is connected to the reservoir 26, and the ports 30 and 32 are motor ports which communicate with opposite ends of a hydraulic cylinder 34. A plurality of grooves 36 in the periphery of pilot member 16 of the slip coupling communicate through internal passages, as will be explained subsequently, with the valve bore 38 in the valve body 14. Bore 38 is transversely disposed relative to the axes of input and output shafts 10 and 12 and has slidably mounted therein a valve spool 40 which is preferably of the conventional open-center type. As will be described subsequently in greater detail, shifting of spool 40 away from the center position will cause an increase in the fluid pressure in one end of the cylinder 34 relative to the fluid pressure in the other end, thus applying hydraulic steering power to the dirigible wheels of the vehicle. As noted, the valving is entirely conventional, however, the structure to effect shifting of the valve spool 40 relative to valve body 14 is novel and improved.

A spur gear 42 encircles the end of output shaft 12 and is fixed thereto. Gear 42 engages a toothed member, schematically indicated at 44, which connects through the usual steering linkage with a dirigible wheel 46 of the vehicle. The previously mentioned hydraulic cylinder 34 is also tied into the steering linkage.

Output shaft 12 includes a slot 48 of limited arcuate extent through which extends a pin 50 which is fixed to the input shaft 10. Fixedly mounted on the output shaft 12 is a saddle-like abutment 52, which has the same chordal thickness as the pin 50. The angular location of abutment 52 is such that it is centered relative to the arcuately extending slot 48. It will be noted that relative rotation of shafts 10 and 12 will be limited by engagement of pin 50 with the ends of slot 48.

A generally cylindrical, axially-split band spring 54 encircles the output shaft 12 so as to present opposed ends to itself, which ends abut opposite sides of the abutment 52 and thus resiliently bias the input shaft 10 to a fixed angular position relative to the output shaft 12. In operation, when a torque is applied to the input shaft 10, and the resistance to turning encountered by the output shaft 12 exceeds the preload of band spring 54, the band spring 54 will expand and the resulting relative rotation between shafts 10 and 12 actuates the valve spool 40 in the valve body 14 as hereinafter described.

A pivot pin 56 is eccentrically mounted on the gear 42 of output shaft 12, and extends axially over the valve body 14 which is fixed to the input shaft 10, as previously noted. A yoke 58 is pivotally mounted on the pivot pin 56 and includes a pair of parallel arms 60 and 62 which snugly but slidably engage flat parallel ends of the valve spool 40 so as to permit sliding motion of yoke 58 relative to valve spool 40, but to restrain relative rotation between the valve spool 40 and the yoke 58.

In the operation of the power steering mechanism of the present invention, as the input shaft 10 is rotated relative to the output shaft 12 by turning the steering wheel 13, the valve body 14, which is affixed to the input shaft, and the spool 40 carried thereby rotate with respect to the pivot pin 56 and the yoke 58. This is true since the pivot pin 56 is carried by the output gear 42 that is, in turn, affixed to the output shaft 12. This causes the spool 40 to be shifted longitudinally within the bore 38 in the valve body 14 by the yoke 58 through the pair of parallel arms 60 and 62 which slidably engage the flat parallel ends of the valve spool 40.

Figure 2:
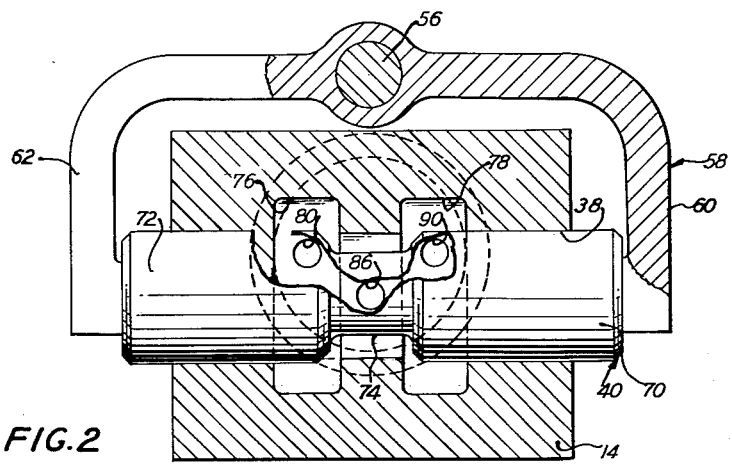
Fig. 2 is a sectional view partially in elevation taken along the lines 2—2 of Fig. 1.
Figure 3:
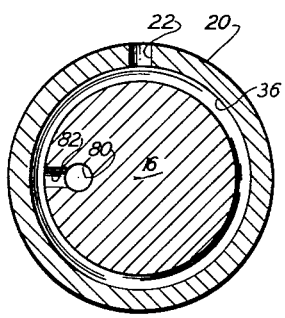
Fig. 3 is a sectional view taken along the lines 3—3 of Fig. 1.
Figure 4:
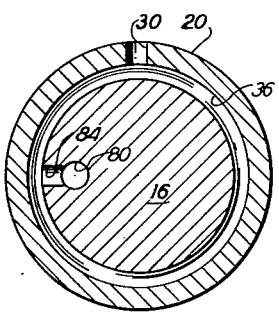
Fig. 4 is a sectional view taken along the lines 4—4 of Fig. 1.
Figure 5:
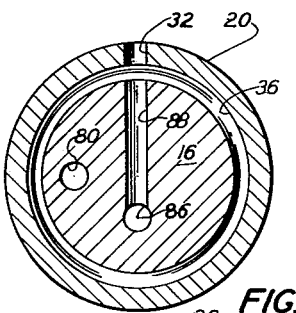
Fig. 5 is a sectional view taken along the lines 5—5 of Fig. 1.
Figure 6:
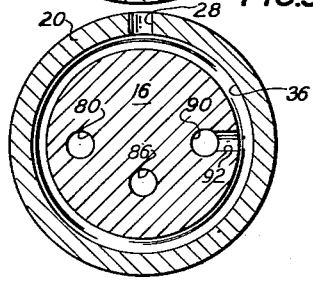
Fig. 6 is a sectional view taken along the lines 6—6 of Fig. 1.

As mentioned previously, the valve spool 40 is preferably of the conventional open center type and as can be seen by reference to Fig. 2 includes two end portions 70 and 72 and a central portion of reduced diameter 74. The valve body 14 includes a pair of enlarged annular sections 76 and 78 spaced axially from each other along the axis of the bore 38.

As can best be seen by reference to Figs. 2–6 the internal or pilot member 16 of the rotary hydraulic slip coupling 18 includes passage means for connecting the valve with the plurality of grooves 36 in the internal member 16 and with the ports 22, 30, 32, and 28. The port 22 is connected with an internal conduit 80 in the internal member 16 through one of the grooves 36 and a radially extending conduit 82, and the port 30 is similarly connected to internal conduit 80 through one of the grooves 36 and radially extending conduit 84. The internal conduit 80 connects with the enlarged annular section 76 in the valve body as can be seen by reference to Fig. 2.

The port 32 is connected to an internal conduit 86 in the internal member 16 through one of the grooves 36 and a radially extending conduit 88, while port 28 is connected to an internal conduit 90 through one of the grooves 36 and radially extending conduit 92 in the internal member 16.

Figure 7:
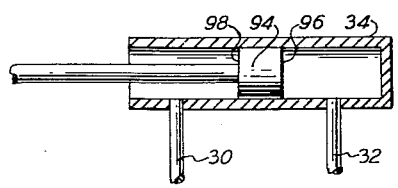
Fig. 7 is a sectional view partially in elevation taken along the lines 7—7 of Fig. 1.

As stated previously, the ports 30 and 32 are motor ports that communicate with opposite ends of a hydraulic cylinder 34. This hydraulic cylinder 34 is of conventional design and includes a piston 94 positioned therein that has a head end 96 having twice the area of the pin or link end 98. As can best be seen by reference to Figs. 1 and 7, the motor port 30 is connected to the pin or link end 98 of the piston while the motor port 32 is connected to the head end 96 of the piston.

In operation of the device of the present invention and with the spool 40 shown in its neutral position, as in Fig. 2, the pump 24 supplies fluid under pressure to the port 22 from the reservoir 26. This fluid under pressure is delivered back to the reservoir 26 through groove 36, radial conduit 82, internal conduit 80, the enlarged annular section 76 in the valve body 14, the internal conduit 90 in the internal member 16, the radial conduit 92, groove 36 and the port 28. Thus in the central position, the cylinder 34 and the piston 94 positioned therein are hydraulically inactive.

If the steering wheel 13 is rotated so that the yoke 58 shifts the valve spool 40 to the left, as viewed in Figs. 1 and 2, the end 70 of the valve spool closes off internal conduit 90 and thus the path to the reservoir 26 by coming into engagement with the central portion of the bore 38. With the valve spool 40 in this position, fluid under pressure from the pump 24 is supplied to the enlarged annular section 76, at noted previously. Fluid from the enlarged annular section 76 is then supplied to the internal conduit 86 in internal member 16. The internal conduit 86 communicates with the motor port 32 leading to the head end 96 of the piston 94 through radial conduit 88, and groove 36. The pin or link end of the piston 94 is also in communication with the fluid under pressure from the pump 24 through port 22, groove 36, radial conduit 82, internal conduit 80, radial conduit 84, groove 36 and motor port 30. Since the head end 96 of the piston 94 has twice the area of the pin or link end 98, the piston will be shifted toward the left, as viewed in Fig. 7, and the dirigible wheel 46 will be moved to change the direction of the vehicle.

If, on the other hand, the steering wheel 13 is turned in the opposite direction to shift the valve spool 40 to the right, as viewed in Figs. 1 and 2, the end 72 will be shifted to close off internal conduit 80 from internal conduits 86 and 90 by coming into engagement with the central portion of the bore 38 in the valve body 14. The head end 96 of the piston 94 is connected, therefore, to the reservoir 26 through the port 32, groove 36, radial conduit 88, internal conduit 86, enlarged annular section 78 in the valve body 14, internal conduit 90, radial conduit 92, groove 36 and port 28. This connection permits the fluid in the cylinder at the head end of the piston to drain into the reservoir. The pin or link end 98 of the piston is connected, however, to the pump 24, through port 22, groove 36, radial conduit 82, internal conduit 80, radial conduit 84, groove 36 and motor port 30. This actions shifts the piston 94 rightwardly, as viewed in Figs. 1 and 7, and the dirigible wheel 46 is moved to change the direction of the vehicle oppositely from that accomplished when the piston 94 is shifted leftwardly.

It will be seen from the foregoing that there has been provided a simple, rugged, and low-cost servo valve for use in the power steering mechanism in which the advantages of simple rotary actuation have been combined with the functional advantages of the linear type valve.

While the form of embodiment of the invention as herein disclosed constitutes a preferred form, it is to be understood that other forms might be adopted, all coming within the scope of the claims which follow.

What is claimed is a follows:

1. In a servo valve for a motor vehicle power steering gear, the combination of: concentric input and output shafts rotatable relative to one another; a valve block carried by one of said shafts and having a valve bore therein, said bore being perpendicularly disposed relative to the axes of said shafts; a valve spool in said bore having at least one end extending from said valve block; a member engaging said one end of said spool and restrained against movement relative to said spool other than translatory; and means for supporting said member on the other of said shafts for pivotal movement about an axis parallel to, but offset from, the axes of said shafts, whereby relative rotation of said shafts effects shifting of said valve spool in said bore.

2. In a servo valve for a motor vehicle power steering gear, the combination of: concentric input and output shafts rotatable relative to one another; a valve block carried by one of said shafts and having a valve bore therein, said bore being perpendicularly disposed relative to the axes of said shafts; a valve spool in said bore having ends extending from opposite sides of said valve block, a yoke member having an arm engaging each end of said valve spool; and means for supporting said yoke member on the other of said shafts for pivotal movement about an axis parallel to, but offset from, the axes of said shafts, whereby relative rotation of said shafts effects shifting of said valve spool in said bore.

3. The structure defined by claim 2 which is further characterized in that said valve spool ends comprise flat, parellel faces and said yoke arms include flat, parallel faces slidably engaging said first named flat parallel faces.

4. In a servo valve for a motor vehicle power steering gear, the combination of: concentric input and output shafts rotatable relative to one another; a valve block carried by one of said shafts and having a valve bore therein, said bore being perpendicularly disposed relative to the axes of said shafts; a valve spool in said bore having at least one end extending from said valve block; a hydraulic slip coupling having a stationary part and a rotary part for conducting fluid to and from said valve bore, said rotary part being carried by said valve body, and having its axis coincident with the axes of said shafts; a member engaging said one end of said valve spool and restrained against movement relative to said spool other than translatory; and means for supporting said member on the other of said shafts for pivotal movement about an axis parallel to, but offset from, the axes of said shafts, whereby relative rotation of said shafts effects shifting of said valve spool in said bore.

References Cited in the file of this patent

UNITED STATES PATENTS

| | | |
|---|---|---|
| 1,790,620 | Daws | Jan. 27, 1931 |
| 2,344,594 | Bryant | Mar. 21, 1944 |
| 2,715,839 | Springer | Aug. 23, 1955 |
| 2,784,600 | Hammond | Mar. 12, 1957 |